Jan. 10, 1956   J. D. BUCHANAN   2,730,124
VALVE
Filed Jan. 25, 1952
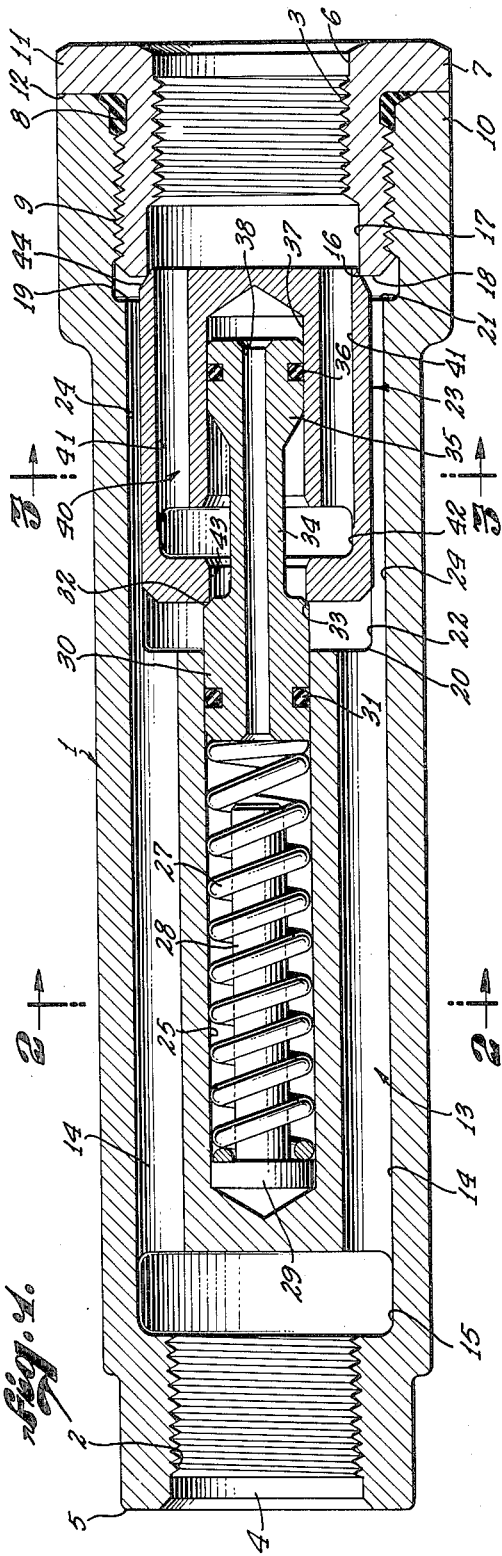
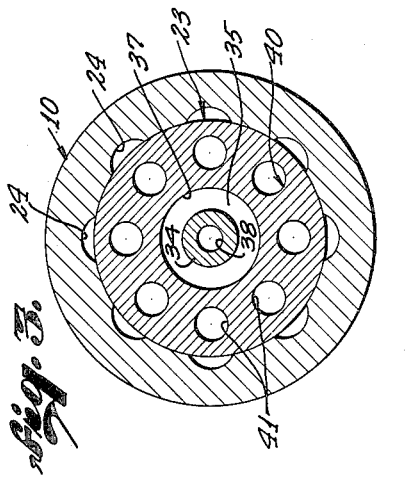
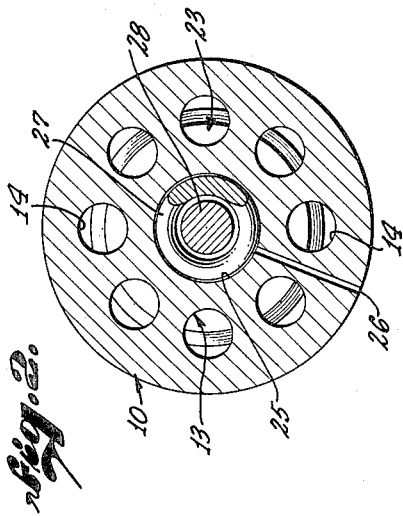
J. D. BUCHANAN,
INVENTOR.
BY  W. E. Beatty
ATTORNEY.

United States Patent Office 2,730,124
Patented Jan. 10, 1956

2,730,124
VALVE

J. D. Buchanan, Burbank, Calif.

Application January 25, 1952, Serial No. 268,174

11 Claims. (Cl. 137—493.1)

The invention relates to a valve, and more particularly to a priority valve which operates at a certain high fluid pressure to transmit the fluid pressure to certain hydraulic devices, while insuring that if there is some failure in the fluid pressure supply, priority is given to emergency items such as brakes connected in advance of the valve by reason of the fact that the valve remains closed until the pressure is sufficient to not only supply the brakes or other priority items, but also build up to a value sufficient to operate the valve.

This priority valve is particularly intended for use with a well-known four-way valve, the priority valve at certain times operating under normal high pressure to supply other devices, and at other times operating for return flow of the fluid when the four way valve is operated to exhaust the pressure fluid to operate the hydraulic devices to their alternate positions. During the time of return flow, the valve is actuated to pressures which drop to a comparative low value such as 50 lbs. or less, while during the high pressure flow the valve is actuated by high pressures of the order of 2500 or 3000 lbs. p. s. i. Also during the high pressure flow, the valve will re-set at a 10% drop of this normal operating pressure.

An object of the present invention is to provide a valve which will meet these widely varying pressure conditions and more particularly to provide a valve which is balanced for back pressure in the outlet during the time that the valve is operating under high pressure conditions.

A further object of the invention is to provide a unitary high and low pressure valve mechanism which will operate under these widely different pressure conditions while being actuated only by a single spring.

A further object of the invention is to provide a valve which is simple in construction, compact and rugged, and well suited for quantity production.

For further details of the invention reference may be made to the drawings wherein Fig. 1 is a longitudinal, sectional view, full scale, of a valve according to the present invention. Figs. 2 and 3 are sectional views on lines of the corresponding numbers in Fig. 1, looking in the direction of the arrows.

Referring in detail to the drawings, the valve comprises an elongated, cylindrical casing 1 having threads 2 and 3 at its opposite ends for connection in a hydraulic line controlled by a four way valve not shown. The threads 2 are in the bore 4 at one end of the casing indicated at 5, while the threads 3 are in the bore 6 of a sleeve insert 7. A seal 8 is arranged at the outer end of the thread coupling 9 between the insert 7 and the hub 10 at the right end of the casing. The seal 8 also extends underneath a flange 11 on the insert 7, this flange overlying the outer end of the casing as indicated at 12.

The bore 4 serves as an inlet and the bore 6 as an outlet when the four way valve is operated to supply fluid under high pressure, whereas bore 6 is an inlet and bore 4 is an outlet for return exhaust flow.

The casing 1 has a circular array 13 of longitudinal extending cylindrical passages like passage 14, eight such passages being shown, each passage like 14 at its left end opening into the chamber 15 which communicates with the bore 4. At its inner end, the sleeve insert 7 has a seat 16 in the form of a sharp corner formed by the intersection of the cylindrical bore 17 with the face or end 18 which lies in a plane at right-angles to the axis of the sleeve 7. At the right end, a portion of each passage like 14 terminates as indicated at 19, a short space from the seat 16, the remainder of each passage like 14, between the points indicated at 20 and at 21, being cut away to provide a cylindrical bore 22 in which the hollow valve member 23 operates. In other words, the passages like 14 are cylindrical bores between the left end of the casing and up to the point indicated at 20, whereas these bores are open grooves as indicated at 24 from the point indicated at 20 to the point indicated at 21, where they are intersected by the cylinder 22.

The array 13 of passages like 14 at the left portion thereof surround a central dead end bore 25 having a vent 26, see Fig. 2, to atmosphere, and in which is arranged a compression spring 27. The spring 27 is supported by a stem 28 on a head 29 which fits in the bottom of the bore 25. The spring 27 at its right end bears on a piston 30 having a ring seal 31 and slidably fitting in the outer end of bore 25. The outer end of piston 30 has a bevel valve head 32 for the right-angular corner 33 which serves as a seat for valve head 32. The piston 30 is at one end of a hollow stem 34 and on the other end thereof is a piston 35 having a ring seal 36 and slidably fitting in the dead end bore 37 in the valve member 23. The vent 26 also serves to vent the inner end of cylinder 37, as the bore 38 opens at one end into the bottom of the cylinder 37, extends through both pistons 30 and 35, and opens at its other end into the cylinder 25 which communicates with the vent 26.

The valve member 23 has an array 40 of passages like 41, eight such passages being shown in Fig. 3. Each passage like 41 at its left end opens into a chamber 42 which communicates with a bore 43 at the inner end of which is the seat 33. At its other end, each passage like 41 opens through the outer end of the valve member 23 and communicates with the bore 6 in the sleeve 7.

The bore 43 is smaller than the bore 25, the difference in area for example being .01 inch square which is the effective area of piston 30 for liquid under pressure in inlet 4. By way of example, we may assume that the spring 27 exerts a force of 25 lbs. With hydraulic oil or other liquid supplied to bore 4 under a pressure of 3,000 lbs. p. s. i., this produces a force of 30 lbs. acting on the effective area of piston 30. This force of 30 lbs. is sufficient to overcome the spring 27 and allow the fluid under pressure to flow through valve 32, 33, bore 43 and passages like 41 and out through the bore 6. The outer end of valve member 23 has a bevel valve-head 44 which remains closed to its seat 16 during high pressure flow as the pressure in inlet 4 is higher than the pressure in outlet 6. During this high pressure flow, if back pressure develops, this does not influence the valve 32, 33, for the reason that the diameter of bore 43 is the same as the diameter of the piston 35 and hence this is balanced for such back pressure.

During return flow, the pressure in bore 4 is substantially zero or very low, while the pressure in inlet 6 drops to a low value such as 50 lbs. or less, but sufficient to actuate spring 27 and open the valve head 44 as such pressure is acting on the large area of the valve member 23. When valve head 44 is open, the return flow passes into passages 24 and 14 and out through bore 4, the valve 32, 33 remaining closed at this time.

The spring 27 thus serves to control the valve for high pressure flow and for low pressure return flow, wherein the difference of these pressures is of the order of a few thousand lbs.

The double piston member 30, 35, the valve member 23 and the sleeve insert 7 are preferably of hardened steel whereas the casing 1 may be of aluminum alloy.

Various modifications may be made in the invention without departing from the spirit of the following claims.

I claim:

1. A valve comprising a casing having a through passage, said casing having a valve seat of a certain diameter for said passage, a hollow valve member having a through passage, said valve member having one end having a valve head for said seat, said valve member having an opposite end having thereon a valve seat of smaller diameter for said passage through said valve member, said casing having a cylinder larger in diameter than said seat on said valve member, and a piston fitting said cylinder, said piston having a valve head for said seat on said valve member, said casing passage having an end portion communicating with said valve head of said hollow valve member, said casing passage having an intermediate portion communicating with said piston and its valve head, said piston having a spring urging both of said valve heads to their respective seats.

2. A valve according to claim 1, said second mentioned valve head having a piston the same diameter as the diameter of said seat on said valve member, said valve member having a cylinder for said last mentioned piston, a passage through said pistons, and a vent in said casing for both of said cylinders.

3. A valve comprising a casing having a through passage, said casing having a combined high pressure inlet and low pressure outlet at one end of said passage with a hollow seat and a combined high pressure outlet and low pressure inlet at the other end of said passage, a hollow low pressure valve member having a valve head for said seat, said valve member having a through passage having a seat smaller in diameter than said first seat and opening into an intermediate portion of said casing passage, a high pressure valve head for said valve seat member, said high pressure valve head having a piston communicating with said casing passage and operable on high pressure in said casing passage to open said high pressure valve head and divert high pressure flow through said valve member, said low pressure valve head having a pressure area responsive to said high pressure to maintain said last mentioned valve head closed, said last mentioned valve head having a pressure area responsive to low pressure in said low pressure inlet to open said low pressure valve head and urge said valve member seat to its high pressure valve head, and a spring urging both of said valve heads to their respective seats.

4. A valve device comprising a casing having a passage having one end comprising a combined high pressure inlet and low pressure outlet and the other end comprising a combined high pressure outlet and low pressure inlet, two concentric fluid pressure operated valves in said passage, one of said valves being larger in diameter than the other and both movable in the same direction to closed position, said larger valve comprising a reciprocating valve having a pressure area exposed to high pressure in said passage, a spring urging both of said valves closed, said smaller valve having a piston exposed to high pressure in said passage and operative to open said smaller valve while said high pressure acts on said pressure area of said larger valve and maintains said larger valve closed, said pressure area of said larger valve being responsive to return low pressure flow in the opposite direction to open said larger valve while said smaller valve is closed by said spring.

5. A valve device according to claim 4, and a piston balancing said smaller valve for back pressure in said high pressure outlet during high pressure flow.

6. A valve device according to claim 5 and a vent serving both of said pistons.

7. A valve comprising a casing having at one end thereof a combined high pressure inlet and low pressure outlet and having at the other end thereof a combined high pressure outlet and low pressure inlet, a high pressure valve in said casing for controlling high pressure flow in one direction and a low pressure valve for controlling low pressure flow in the opposite direction, said casing having a cylinder, said high pressure valve comprising a piston for said cylinder, a spring urging said piston outwardly of said cylinder towards said combined low pressure inlet and high pressure outlet to close said high pressure valve, said high pressure valve comprising a valve head on said piston and a cooperating seat on said low pressure valve, said low pressure valve comprising a reciprocating valve member having a valve head and a cooperating seat therefor fixed to said casing, said high and low pressure valves both closing in the same direction, said low pressure valve head having a pressure area exposed to high pressure in said casing to urge said low pressure valve head to its said seat at certain times and exposed to low pressure in said low pressure inlet to urge said low pressure valve open at other times.

8. A valve comprising a casing having at one end thereof a combined high pressure inlet and low pressure outlet and having at the other end thereof a combined high pressure outlet and low pressure inlet, a high pressure valve in said casing for controlling high pressure flow in one direction and a low pressure valve for controlling low pressure flow in the opposite direction, said casing having a cylinder, said high pressure valve comprising a piston for said cylinder, a spring urging said piston towards said combined low pressure inlet and high pressure outlet to close said high pressure valve, said high pressure valve comprising a valve head on said piston and a cooperating seat on said low pressure valve, said low pressure valve comprising a reciprocating valve member having a valve head and a cooperating seat therefor fixed to said casing, said high and low pressure valves both closing in the same direction, said low pressure valve head having a pressure area exposed to high pressure in said casing to urge said low pressure valve head to its said seat when said high pressure valve is open and exposed to low pressure in said low pressure inlet to urge said low pressure valve open when said high pressure valve is closed.

9. A valve comprising a casing having a combined high pressure inlet and low pressure outlet and having a combined high pressure outlet and low pressure inlet, a high pressure valve in said casing for controlling high pressure flow in one direction and a low pressure valve for controlling low pressure flow in the opposite direction, said casing having a cylinder, said high pressure valve comprising a piston for said cylinder, a spring urging said piston outwardly of said cylinder towards said combined low pressure inlet and high pressure outlet to close said high pressure valve, said high pressure valve comprising a valve head on said piston and a cooperating seat on said low pressure valve, said low pressure valve comprising a reciprocating valve member having valve head and a cooperating seat therefor fixed to said casing, said high and low pressure valves both closing in the same direction, said low pressure valve head having a pressure area exposed to high pressure in said casing to urge said low pressure valve head to its said seat at certain times and exposed to low pressure in said low pressure inlet to urge said low pressure valve open at other times, each of said valves when open by-passing the other valve.

10. A valve comprising a casing having a combined high pressure inlet and low pressure outlet and also having a combined high pressure outlet and low pressure inlet, a high pressure valve in said casing for controlling high pressure flow in one direction and a low pressure valve for controlling low pressure flow in the opposite direction, said casing having a cylinder, said high pressure valve comprising a piston for said cylinder, said piston being exposed to high pressure in said high pressure inlet to move said high pressure valve towards said high pressure inlet to open position, a seat for said high pressure valve on said low pressure valve, said low pressure valve having a valve head and a cooperating seat fixed to said casing, said low pressure valve having a piston area exposed to said high pressure to urge said low pressure valve to closed position towards said high pressure outlet, spring means urging said valves to closed position, said low pressure valve having a pressure area exposed to low pressure in said low pressure inlet to open said low pressure valve, each of said valves when open by-passing the other valve and both of said valves closing in the same direction.

11. A valve comprising a casing having a high pressure fluid operated valve controlling flow in one direction and a low pressure fluid pressure operated valve controlling flow in the opposite direction, both of said valves closing in the same direction, said low pressure valve controlling a by-pass inside of said casing around said high pressure valve and said high pressure valve controlling a by-pass through the interior of said low pressure valve, and a spring urging both of said valves to closed position, and separate fluid pressure operated means for said valves fo ropening each of said valves when the other valve is closed.

References Cited in the file of this patent

UNITED STATES PATENTS

| | | |
|---|---|---|
| 1,553,215 | Christensen | Sept. 8, 1925 |
| 1,609,476 | Jarvis | Dec. 7, 1926 |